United States Patent
Hilbig

[15] 3,685,459
[45] Aug. 22, 1972

[54] ROLL CAKE MACHINE

[72] Inventor: Hartmut Hilbig, Albrechtstrasse 55, Berlin, 41, Germany

[22] Filed: April 2, 1970

[21] Appl. No.: 25,010

[30] Foreign Application Priority Data

April 9, 1969 Germany..........P 19 18 767.8

[52] U.S. Cl.................................................107/59
[51] Int. Cl. ...............................................A21b 3/00
[58] Field of Search ..................107/1 R, 1 A, 54–59, 107/60–63

[56] References Cited

UNITED STATES PATENTS 3,232,247 2/1966 Vaughan......................107/59
3,333,529 8/1967 Wilson.......................107/59 X

FOREIGN PATENTS OR APPLICATIONS 556,319 5/1928 Germany.....................107/59

*Primary Examiner*—Jordan Franklin
*Assistant Examiner*—Geo. V. Larkin
*Attorney*—Ernest F. Marmorek

[57] ABSTRACT

The machine for the automatic production of multilayer roll cakes comprises a drum-like structure that is intermittently driven for rotation by a star wheel drive. A plurality of rotary rods supporting the roll cakes are removably seated on the periphery of the drum structure. The rods are continuously driven for rotation about their own axis by a rope drive. An oscillatory cake paste trough is located at the bottom area of the drum structure and is synchronized with its intermittent movement to bring the cake paste sequentially into engagement with the paste spreading rollers of the lowermost rods.

16 Claims, 4 Drawing Figures

PATENTED AUG 22 1972 3,685,459
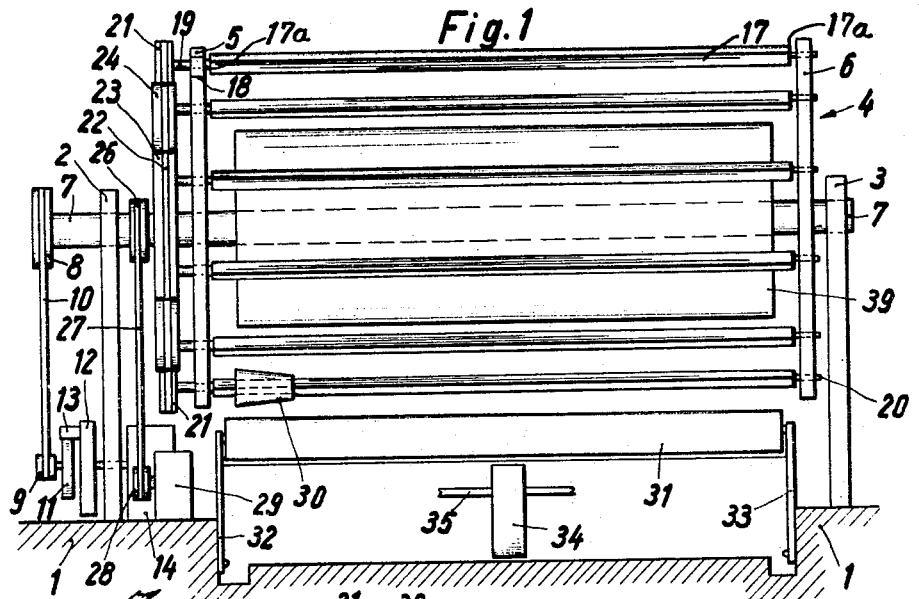
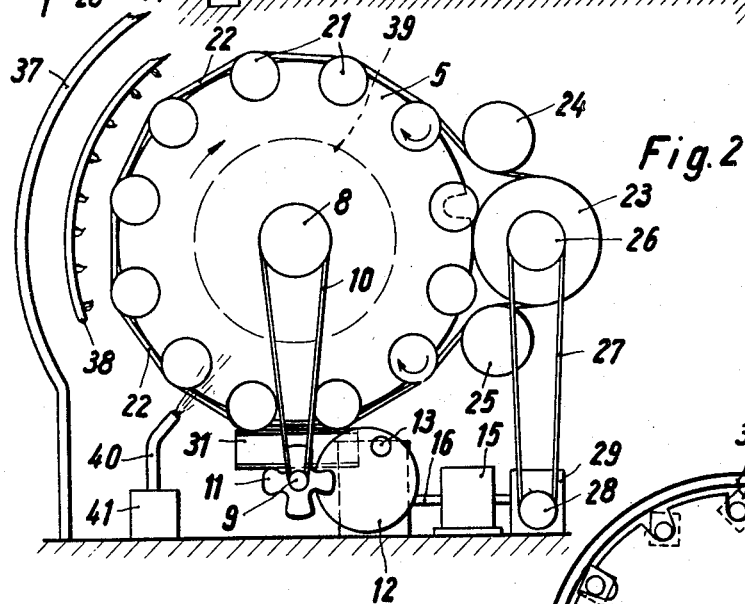
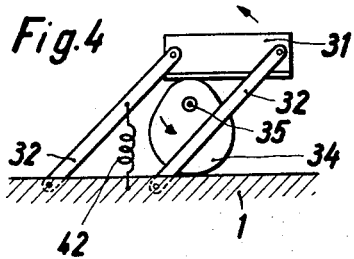
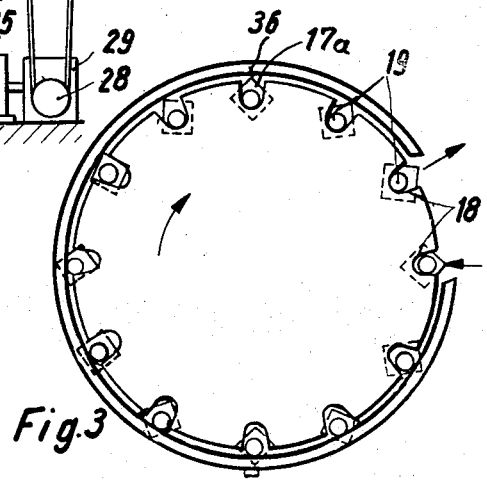
Inventor:
Hartmut Hilbig,
His Attorney.

ROLL CAKE MACHINE

This invention relates generally to machines for manufacturing and baking pastry and, more particularly, to an automatic machine for the production of roll cakes.

As known, conventional roll cakes have been produced by the aid of rotating carrier rods upon which paste spreading rollers covered by a paper coating have been affixed. The rods together with the rollers have rotated about their axis and the cake paste has been manually spread over the rollers. The carrying rods have been supported on two spaced end disks and have formed therewith a drum-like structure. The carrier rods have been arranged vertically and the entire drum-like structure has also been driven by hand to move the rotating cake paste layers on the rollers past a baking zone. At the beginning of each rotation of the drum structure, a new layer of the cake paste has been applied on the old one. The rotations have been repeated so many times until the roll cake has attained the desired size and could be removed, after the removal of the carrier rod from the drum structure, from the frustoconically shaped spreading rollers.

BRIEF SUMMARY OF THE INVENTION

It is an object of this invention to eliminate the manual attendance of the prior art roll cake machines, and to provide a fully or almost fully automatic machine for the production of multilayer roll cakes.

It is another object of this invention to facilitate the discharge of the finished roll cakes from the machine.

Still another object of this invention is to improve operational safety of the roll cake machine.

According to this invention, the above objects are attained by providing a plurality of carrier rods arranged for rotation about their axes on the periphery of two spaced end disks and forming therewith a horizontally directed drum-like structure. The disks are firmly connected to a central driving shaft. Each carrier rod supports a plurality of rollers upon which the roll cake paste is spread. The drum structure periodically delivers the spread paste layers past a baking zone also provided in the machine. The improvement of this invention resides in the fact that a common motor is coupled through transmission means to a. a star wheel drive connected to the central drive shaft of the drum-like structure to impart an intermittent rotary motion thereto, and to b. a rope drive that is coupled to the majority of the carrier rods to continuously rotate the latter about their own axes.

In a further development of this invention, the common motor is coupled to an eccentric cam which controls the vertical oscillatory movement of the trough for the cake paste. The cam lifts or lowers the trough in concert with the step-by-step angular movement of the drum to place always the paste spreading rollers of the lowermost carrier rod into engagement with the trough. The ends of the carrier rods are loosely seated in axial bores in one of the end disks, whereas the opposite ends thereof rest in semi-circular notches around the periphery of the second end disk. A C-shaped shield is disposed in operative proximity to this second end disk to prevent the rods from falling out of the position in the notches. The open portion of the C-shaped shield serves as a manipulation site for the manipulation of the roll cake carrying rods. The end portions of the carrier rods situated at the driving side of the machine project through the notches of the end disk, and each is provided with a follower pulley. These pulleys are driven by a rope, wedge belt, chain or the like, which engages an outer peripheral portion of each pulley. The rope is driven by a continuously rotating drive pulley that is situated at the manipulation site of the machine in front of the open segment of the C-shaped shield. Instead of the rope drive, it is also possible to employ a gear drive and the like. To equalize the heat distribution in the drum structure it is recommended that a metal, heat reflecting cylinder be fixedly mounted within the drum-like structure to uniformly distribute the heat radiation impinging on the cake paste layers. The working heat is generated usually by a gas pipe multiflame burner. The drum structure as well as the pipe burner are enclosed in a common housing preferably of metal.

BRIEF DESCRIPTION OF SEVERAL VIEWS OF THE DRAWING

For a better understanding of the principle of this invention and of further objects and advantages thereof, reference is made to the following description of an exemplary embodiment taken in conjunction with the figures of the accompanying drawing, in which FIG. 1 is a simplified elevational view, partly in section, of the roll cake machine according to this invention;

FIG. 2 is a fragmentary side view of the machine of FIG. 1;

FIG. 3 is a side view of the notched end disk arrangement in the machine of this invention; and FIG. 4 is a side view, partly in section, of the oscillatory trough for the cake paste.

DETAILED DESCRIPTION

Referring now to FIGS. 1 and 2, two vertical support columns 2 and 3 are anchored in a base or bed 1 and support a horizontal driving shaft 7 of a rotary drum structure 4. The drum structure 4 is made up of two spaced, parallel end disks 5 and 6 that are firmly connected to the driving shaft 7. The projecting left-hand end of the shaft 7 is terminated with a drive pulley 8 that is coupled through a belt 10 and a pulley 9 to a star wheel drive 11, 12 and 13. The star wheel drive comprises a star wheel 11 and a drive wheel 12 with a laterally projecting carrier pin 13 that engages with consecutive slots of the star wheel 11, thereby imparting an intermittent rotary motion to the entire drum structure 4. The drive wheel 12 is coupled through transmission gears 14 and a shaft 16 to a common driving motor 15. The end disks 5 and 6 are provided with means for receiving and holding a plurality of roll cakes carrying rods 17. In the preferred embodiment as shown in FIGS. 2 and 3, there are employed twelve polygonal, preferably tetragonal, rods 17 that are terminated at the ends thereof with cylindrical journals 19 and 20 having reduced diameter with respect to the perimeter of the polygonal intermediate portions of the rods 17, so that shoulders 17a will result at both ends of each intermediate portion. The periphery of the left-hand end disk 5 is provided with twelve regularly spaced semicircular notches 18 in which the projecting left hand journals 19 are loosely seated. To prevent these journals 19 from falling out of their position during the rotation of the drum, a C-shaped shield 36 (FIG. 3) encloses the major peripheral portion of the end disk 5. The right-hand journals 20 of the rods 17 loosely rest in corresponding axial recesses or bores in the marginal portion of the end disk 6. The open sector in the C-shaped shield 36 determines the manipulation site of the machine. Through this manipulation site, the empty rods 17 are inserted into the drum structure 4, and removed therefrom with the finished roll cakes.

As seen in FIG. 1, the left hand journals 19 project through the end disk 5. These projecting ends of journals 19 support rod drive pulleys 21, respectively. These pulleys 21 are arranged in one plane and driven by a continuous drive rope 22 that tangentially engages outer peripheral portions of all pulleys 21 except those that occur opposite to the open sector of the shield 36, as will be explained later. The rope 22 is driven through a rope drive pulley 23 and intermediate transmission means with the common motor 15. The intermediate transmission means comprises a pulley 26 integrally connected to the drive pulley 23, a belt 27, a driving pulley 28 and a transmission gear 29. Two tightening pulleys 24 and 25 serve for improving the frictional contact between the drive rope 22 and the peripheral portions of the rod drive pulleys 21. If necessary, one of these tightening pulleys may be omitted.

As mentioned above, the rope drive pulley 23 as well as the rope tightening pulleys 24 and 25 are situated opposite to the open sector of the C-shaped shield 36. As a result, the rod drive pulleys 21 that appear during rotation of the drum structure 4 at the manipulation site of the machine (the right-hand side of FIG. 2) always disengage from the drive rope 22 and stop their rotary motion.

The intermittent rotary drive for the drum structure 4 and the continuous drive for the carrying rods 17 are interadjusted by the transmission gears in such a manner as to turn step-by-step the drum structure 4 about the axis of the shaft 17 at the time intervals of several seconds, such as of five to fifteen seconds for example, whereby the carrying rods 17 will simultaneously rotate about their own axes several times during each interval, e.g. three times. It is advantageous when the rotation rate of the common driving motor 15 can be controlled.

As indicated in FIG. 1, the polygonal rods 17 support conventional frustoconical rollers 30 covered by a paper coating. For the reason of simplicity, only one roller 30 is shown in the drawing. Each roller 30 has a central passage matching the polygonal surface of the rods 17 so that a plurality of rollers can be removably introduced on each rod 17 and rotated therewith. The rollers 30 serve for spreading the cake paste on their paper coated conical surfaces. This cake mixture or paste can be applied on the rollers 30 either manually or, according to further improvement of the machine, in a fully automatic cake paste applying process. To enable this fully automatic operation of the machine according to this invention, an elongated trough 31 is disposed beneath the lowermost portion of the drum structure 4. The trough 31 extends along the carrying rods 17 (FIG. 1). With reference to FIGS. 1 and 4, a driving mechanism for imparting an oscillatory movement to the trough 31 will now be described. The trough 31 for the cake paste is joined at each end thereof to a pair of parallel levers 32 and 33 which are swingably mounted to the bed 1 to make a parallelogram with the trough 31. The vertical position of the trough 31 is periodically adjusted by means of an eccentric cam 34 and a restoring spring 42. The eccentric cam 34 is coupled through a driving shaft 35 and further transmission means (not shown) to the common driving motor 15. The rotation of the eccentric cam 34 is adjusted such as to lift the trough 31 during the standstill period of the drum structure 4 and put it close to the lowermost carrying rod 17. The rotating spreading rollers 30 come thereby into engagement with the cake paste in the trough 31, and a paste layer is uniformly spread over the entire surface of the roller 30. During the following angular displacement of the drum structure 4, the paste layer on the roller 30 is forwarded past the baking zone and the trough 31 is lowered to its lower level. The roll cake machine of this invention is equipped preferably with a multiflame gas pipe burner system 38 that is situated in the baking zone opposite to the manipulation site. A metal housing 37 encloses the burner system 38 and the major portion of the periphery of the drum structure 4. A stationary heat reflecting cylinder 39 is arranged coaxially with the driving shaft 7 within the drum structure 4. The heat reflecting cylinder 39, made preferably of metal, distributes uniformly the heat from the burner system 38. To produce the customary decorative notches in the roll cakes, a series of blowers 41 with pressure air nozzles 40 are aligned along the drum 4. The air nozzles 40 are directed to blow air jets tangentially on the cake paste layers prior to their entrance into the baking zone opposite to the heater system 38.

When attending the machine of this invention, the operator first puts the frustoconical spreading rollers 30 side-by-side on each carrying rod 17. The aperture in the rollers 30 matches the polygonal profile of the carrying rods 17 so that no undesired displacement of the rollers can take place. Subsequently, the rods with the aligned rollers are inserted through the manipulation opening into the drum structure 4. During the standstill condition of the drum 4, the projecting lefthand journals 19 are first inserted into the semicircular notches 18 on the periphery of the end plate 5, and then the right-hand journals 20 are seated into the corresponding bore in the end disk 6. During the subsequent rotational steps of the drum 4, the rotating rollers 30 are dipped into the cake paste in the lifted trough 31 and the paste layers of the previously dipped rollers are baked in the baking zone. The location of the open segment in the C-shaped shield 36 is designed so as to prevent the rods from falling out of the notches 18 (FIG. 3). In accordance with the required amount of paste layers on the spreading rollers 30, the drum structure 4 will perform a corresponding number of intermittent rotations, since during one rotation always one paste layer is spread and baked on the resulting roll cakes. As soon as the production process on a carrying rod is finished, this rod is removed through the opening at the manipulation site and at the same time replaced by a new rod 17 with a row of empty rollers 30.

For the reason of simplification, certain conventional parts of the machine, such as transmission gears, drives and bearings, for example, are illustrated either in a simplified schematical form or even are completely omitted. For the same reason, the power transmitting means are illustrated with the application of simple pulleys and ropes only.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. A roll cake machine for the automatic production of multilayer roll cakes comprising, in combination,
a horizontally directed driving shaft,
two spaced end disks connected to said driving shaft,
a plurality of carrying rods supported on the periphery of said end disks to form a drum-like structure therewith,
a plurality of cake paste spreading rollers coaxially supported on said carrying rods,
burner means disposed at a heating zone near said drum-like structure,
a driving motor,
star wheel drive transmission means coupled between said driving motor and said driving shaft to impart an intermittent motion to the entire drum-like structure, and
continuous drive transmission means coupled between said carrying rods and said driving motor to continuously rotate said carrying rods about their own axes.

2. A roll cake machine according to claim 1 further comprising elongated trough means for receiving the cake paste, said trough means being situated beneath said drum-like structure, vertically swingable support means for supporting said trough means, and an eccentric cam drive arranged for imparting an oscillatory vertical movement to said trough means to bring the cake paste within said trough means in contact with the rotating paste spreading rollers of the lowermost carrying rods.

3. A roll cake machine according to claim 2 wherein said eccentric cam drive is interadjusted with said star wheel drive transmission means to raise said paste trough means against said lowermost carrying rods during each interval of said intermittently driven drum-like structure.

4. A roll cake machine according to claim 2 wherein said vertically swingable support means is a parallelogram guide.

5. A roll cake machine according to claim 1 further comprising a plurality of substantially semicircular notches provided around the periphery of said end disks for receiving the end portions of said carrying rods, and C-shaped shield means arranged in operative proximity to said end disks to keep said rods in positions in said notches whereby the open sector in said shield means determines the manipulation side through which the carrying rods are inserted in and removed from said drum-like structure.

6. A roll cake machine according to claim 5 wherein end portions at one side of said carrying rods project through the notches of one of the supporting end disks, and said continuous drive transmission means includes a plurality of follower pulleys arranged in one plane and secured to said projecting end portions respectively, a driving pulley disposed opposite said open sector in said shield means, and a continuous rope means driven by said driving pulley and engaging all said follower pulleys except those occurring in the area of said open sector.

7. A roll cake machine according to claim 5 wherein the peripheral area of the other one of said end disks is provided with axially directed bores corresponding in position to said notches, to receive the opposite ends of said carrying rods.

8. A roll cake machine according to claim 7 wherein the intermediate portion of each rod is provided with shoulders to prevent an axial displacement of said rods in said end disks.

9. A roll cake machine according to claim 8 wherein said intermediate portion has a polygonal cross-section.

10. A roll cake machine according to claim 1 further comprising heat reflecting means disposed within said drum-like structure.

11. A roll cake machine according to claim 10 wherein said heat reflecting means is a stationary metal cylinder arranged coaxially with said shaft to uniformly distribute the heat from said burner means.

12. A roll cake machine according to claim 1 wherein said burner means is a multiflame gas pipe burner arranged opposite to said open sector of said shield means.

13. A roll cake machine according to claim 1 further comprising a metal housing surrounding said drum-like structure and said burner means.

14. The machine according to claim 1 wherein said plurality of carrying rods is a set of twelve tetragonal rods terminated with cylindrical journals.

15. The machine according to claim 1 wherein said star wheel drive transmission means and said continuous drive transmission means are interadjusted to provide several rotations of said carrying rods during each angular displacement of said intermittently driven drum-like structure.

16. A roll cake machine according to claim 1 further comprising a series of pressure air nozzle means directed perpendicularly to the axis of said roll cakes in the area between said paste trough and said heating zone to create grooves in said roll cakes during the plastic state of the applied paste layers.

* * * * *